May 19, 1970   G. H. BAKER, JR., ET AL   3,512,273
EDUCATIONAL DEVICE
Filed Aug. 15, 1968   2 Sheets-Sheet 1
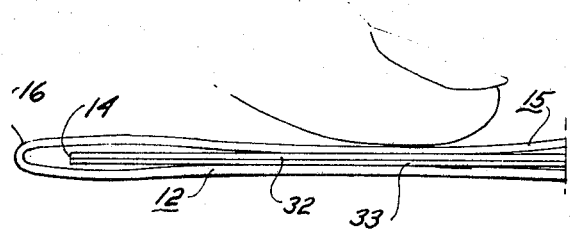
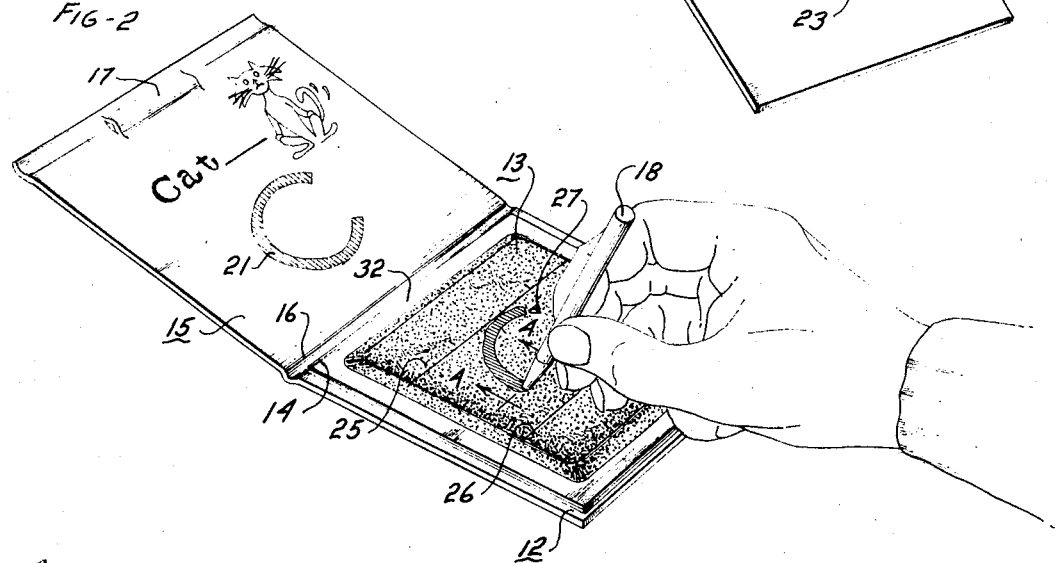
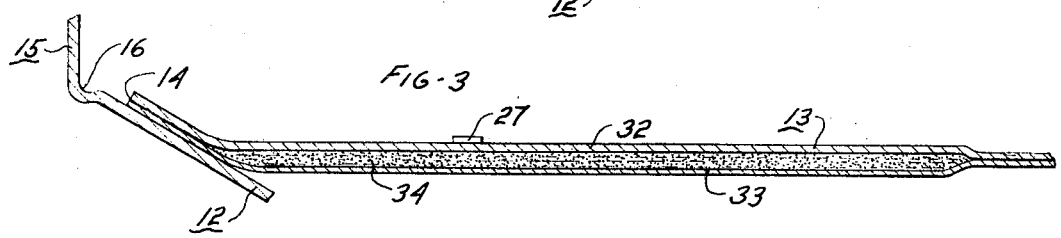
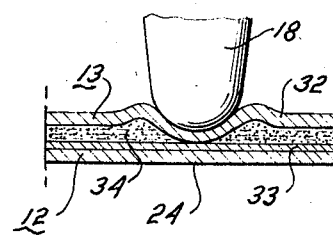
INVENTOR.
GORDON H. BAKER Jr.
MARY LOU KELLY
BY
ATTORNEYS May 19, 1970　　G. H. BAKER, JR., ET AL　　3,512,273
EDUCATIONAL DEVICE Filed Aug. 15, 1968　　2 Sheets-Sheet 2

INVENTOR.
GORDON H. BAKER JR.
MARY LOU KELLY
BY
ATTORNEYS

United States Patent Office 3,512,273
Patented May 19, 1970

3,512,273
EDUCATIONAL DEVICE
Gordon H. Baker, Jr., Birdsboro, and Mary Lou Kelly, Pottsville, Pa., assignors to Wyomissing Corporation, a corporation of Pennsylvania
Continuation-in-part of application Ser. No. 621,222, Mar. 7, 1967. This application Aug. 15, 1968, Ser. No. 753,005
Int. Cl. G09b *11/86;* B43l *1/00*
U.S. Cl. 35—66                                  22 Claims

ABSTRACT OF THE DISCLOSURE

An autoinstructive teaching device useful, for example, for teaching the formation of characters such as letters, geometric shapes and indicia, comprising a work surface with means associated therewith in one area providing a latent image which may be made visible by tracing over the image with a marking element or stylus. The work surface also having means associated therewith at least in an area surrounding the image, providing for obscuring the definition of the image upon traverse of the marking element from one of said areas to the other, so that the latent image may be developed with clear definition only by accurately tracing over the latent image whereby the student obtains reinforcement or reward only by accurate work.

---

The present application is a continuation-in-part of our application Ser. No. 621,222, filed Mar. 7, 1967 and now abandoned.

The present invention relates to autoinstructive educational devices and has particular application to devices for teaching or developing the minds of students, for instance teaching the formation or reproduction of letters, numerals, geometric shapes, and other characters, especially such characters in line form, i.e., presented or outlined by means of lines as well as other self-correcting teaching devices.

According to widely recognized principles or tenets of behavioral psychology, the learning process is stimulated by rewards or reinforcement following or resulting from correct performance by the student. It is also recognized that the reward or reinforcement should preferably follow the correct performance virtually instantaneously and also without the necessity for intermediate stages of reasoning. Immediate reinforcement for correct performance is also well recognized to be much more effective than aversive control (negative reinforcement) and than indiscriminate reinforcement.

In the application of these principles it is a virtual impossibility for a teacher to check the individual results of a group of students personally and to provide the encouragement or reinforcement that is desirable to stimulate and accelerate the learning process. This is particularly true where it is necessary for a single teacher to supervise the work of a substantial number of students. Autoinstructive teaching aids therefore are of great importance, as has been recognized.

In the application of the foregoing principles to teaching the reproduction of characters, for instance the letters of the alphabet, it has been known to employ teaching devices or educational aids in which work sheets are provided having images thereon which are latent or initially indiscernible but which may be made visible by the use of a stylus which the student applies to the area of the latent image in accordance with the student's observation of a visible control image. In this way the student may develop the latent image and render it visible. Similar work sheets are already known in which the visible control image is not necessarily geometrically identical with the latent image to be made visible, but in which the control image is nevertheless logically related to the latent image. For example, the control image may comprise a picture or drawing of a cat and the latent image to be made visible may comprise the letter C, the student being called upon to make visible the first letter of the name of the picture of the animal, or of any specified article.

An example of teaching aids of known type as described above may be found in the Skinner U.S. Pat. No. 3,363,-336, issued Jan. 16, 1968. While the devices disclosed in the Skinner patent represent helpful teaching aids, they are deficient in one important respect, when taking into account one of the most important principles of behavioral psychology, and it is an object of the present invention to provide a teaching aid having improved characteristics fully satisfying all of the major principles of behavioral psychology above referred to.

In further explanation of the improvement effected by the present invention, reference is first made to the arrangement of the prior known devices. In accordance with various of the prior work sheet type of teaching aids, such as those disclosed in the Skinner patent, and by way of example, a latent line image of a letter is provided in one area of the work sheet so that upon the employment of a suitable stylus the latent image may be made visible by the student tracing the image line of the letter. In these prior devices the area surrounding or adjacent the area of the latent image may either be untreated or may be printed with some material which, when acted upon by the stylus, will produce a color contrasting with that of the image. With these prior known work sheets, the latent image may be produced by the student not only by tracing the line of the letter with the stylus, but also by a "scribbling" type of activity where the stylus is repeatedly passed back and forth over the general area in which the latent image is located until virtually the entire general area is covered with stylus lines. In this type of activity the stylus repeatedly passes across the image line and into the adjacent areas of the work sheet, but notwithstanding this, the image of the letter which is made visible is clearly defined.

Other prior art devices, of the self-correcting test type, are described, for example in U.S. Pats. 1,884,197 and 2,618,866.

In view of the foregoing, in the prior art devices the student may receive his reward or reinforcement not only as a result of correctly following the prescribed tracing of the letter but also as a result of an indiscriminate activity which bears no relation to the correct production of the letter.

In contrast with the foregoing, the present invention provides a work sheet having in one area a latent image of a character, for example the letter C, and having means associated with a surrounding or adjacent region to prevent the development of the image or to obscure or otherwise obfuscate the developed image upon traverse of the stylus or marking element from one of said areas into the other. In consequence of this, a clearly defined image may be developed in the latent image area only as a result of the student using the stylus to follow the line of the letter. The scribbling type of motion of the stylus or any other substantial deviation from the latent image area will, at least in part, obscure the definition of the image and thus impair the reinforcement or reward following from correct performance by the student. This effect moreover is immediate and requires no intermediate stages of reasoning. Thus maximum reinforcement is achieved from the student's correct performance.

A further object of the invention is to provide a teaching device of the type above referred to further incorporating visible guide means adjacent a portion of the area of the latent image, indicating the location thereof and thus facilitating at least the commencement of the activity of the stylus in rendering the image visible.

In the case of work sheets adapted for use in teaching the formation of letters or numerals, and especially where such a work sheet is to be employed in the teaching of cursive writing, the invention contemplates the use of visible guide means indicating the correct point for starting the formation of the letter or numeral.

As will further appear herebelow, either physical or chemical means may be employed in achieving the objectives of the present invention, i.e., the work sheets of the present invention may incorporate either physical or chemical means of providing in one area the desired latent image, and, in an adjacent area, the means by which the definition of the image will be, at least in part, obscured in the event of deviation of the stylus or marking element from the latent image area and traverse of the stylus from one area into another.

How the foregoing objects and advantages are attained, together with others which will occur to those skilled in the art, will appear more fully from the following description referring to the accompanying drawings, in which a mechanical or physical system according to the invention is illustrated in FIGS. 1 to 5 inclusive and in which a chemical system is illustrated in FIGS. 6 to 9 inclusive. Specifically, in these drawings:

FIG. 1 is a perspective view of an educational device embodying mechanical means for the purposes of the invention;

FIG. 2 is a perspective view of the device shown in FIG. 1 as it is used;

FIG. 3 is an enlarged transverse sectional view taken on the line 3—3 of FIG. 1;

FIG. 4 is an enlarged sectional view taken on the line 4—4 of FIG. 2;

FIG. 5 is a partial edge view illustrating a certain operation as will be described hereinafter;

Figure 6:
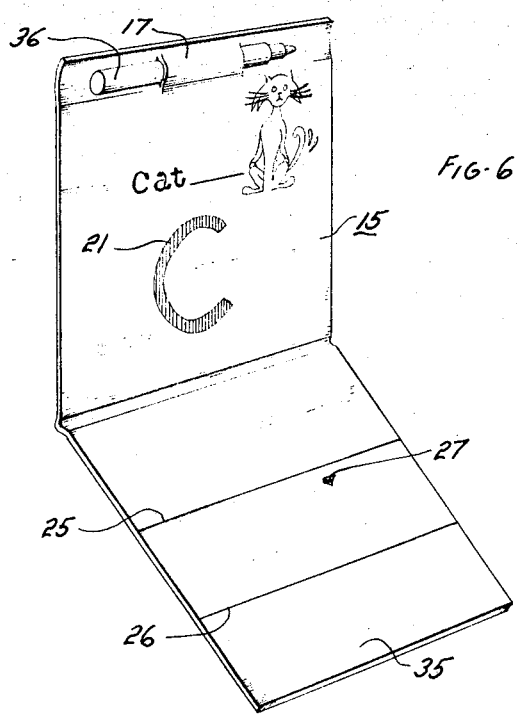
FIG. 6 is a view similar to FIG. 1 but illustrating a modified form of device in which chemical means are employed for the purposes of the present invention, instead of the mechanical means as in the embodiment of FIGS. 1 to 5 inclusive.

Referring now to FIGS. 1 to 5 of the drawings, the instruction device illustrated therein comprises a backing member 12 having a cover member 13 secured thereto along its top edge 14. An instruction panel 15 is hingedly connected to the backing member 12, for example by a hinge line 16 along the upper edge 14. In the present instance, the instruction panel 15 has a sleeve 17 secured thereto for receiving a stylus 18.

The educational device illustrated in FIGS. 1 to 5 is designed to train a student to write a single character correctly, in the present instance the letter C. To this end, the instruction panel 15 has an imprint or control image 21 thereon of the letter C in conjunction with the word "Cat" and an illustration of a cat. It will be apparent to an educator that variations may be made in this instruction panel. For example, the letter C may be omitted from the panel so that the student will be required to supply the letter C without having the letter before him. In addition, it is possible to teach the writing of entire words or teach the relationship and reproduction of simple geometric shapes such as triangles, squares, circles, etc. The device is not limited to the teaching of block printing, but also may be used effectively to train the student in cursive writing. Thus, it is apparent that the imprint 21 on the instruction panel 15 may be varied within wide limits, in accordance with the training level of the student.

In the use of the educational device, the character from the instruction panel is reproduced on the cover sheet member 13 by making an impression thereon with the stylus 18. Application of an impression to the cover member 13 renders the normally opaque cover member 13 translucent, in the present instance transparent, in the area of the impression so as to expose the backing member 12 thereunder. To provide guidance for the proper marking of the cover member 13, the backing member 12 is provided with indicia corresponding to the indicia indicated by the imprint 21 on the instruction panel 15. As shown in FIG. 1, the indicia, in the present instance, comprises the letter C as indicated at 23 on a contrasting background 24. In the present case, the letter C is printed on the background 24 with fluorescent ink so as to stand out sharply against the background. If the letter C is printed with red ink, the background 24 may be either black or white, or any color providing a clear color contrast.

Where letters of other colors are used, the background color should be selected to provide a distinct color contrast.

With the target image applied to the backing member 12 and with the normally opaque cover 13 overlying the backing member, these components cooperate in providing a work surface having means associated therewith in a first area providing a latent image of a character initially optically indistinguishable from an adjacent area of the work surface but which may be made visible by applying a marking element to the area of the image.

To insure that the impression made on the cover sheet 13 registers with the indicia 23, the cover sheet is provided with suitable guide means. In the present instance, the guide means consists of a pair of guide lines 25 and 26 a starting guide 27 to indicate to the student the proper starting point for the letter C. In forming the letter C properly, the student should start making an impression at the starting guide 27 and draw a curved line between the guide lines 25 and 26; terminating above the guide line 26 in vertical registry with the starting guide 27. If the character is formed properly, the indicia 23 on the backing 12 will appear through the translucency provided by the impression made by the student.

The guide means also cooperates with the indicia to enable the student to distinguish between the correct procedure for forming the characters and an incorrect procedure. For example, if the student starts from the starting guide 27 and incorrectly proceeds toward the right instead of toward the left, he will note that there is no indicia under the cover there, thereby indicating that the procedure is incorrect. When he proceeds toward the left, the indicia 23 will appear, indicating that the procedure is correct.

It is apparent that the embodiment of the present invention above described may also be used in "hidden answer" devices, games, and the like, wherein guide means on the cover cooperate with indicia on the backing. For example, in a device for teaching students to select the corresponding figure from a group of figures, the group is imprinted on the cover to serve as a guide means which the student may trace or encircle. Indicia on the backing underlies only the correct figure or figures so that when the student selects the correct figure, the indicia appears, whereas when he selects the incorrect figure, no indicia appears.

Referring again to the embodiment illustrated in FIGS. 1 to 5, it will be apparent that additional guide lines may be provided for beginning students, or the guide lines may be omitted for more advanced students. Furthermore, this embodiment of the invention utilizes a single character on the backing 12 but if desired, the backing may be provided with an entire series of characters. Preferably, a starting guide is provided for each character in the series so as to enable registry of the impression on the cover member 13 with the indicia 23 on the backing 12.

The arrangement described provides clarity of definition of the image being rendered visible by the action of the stylus only in the event that the correct curvature or line of the latent image is followed or traced, the definition being obscured in the event the stylus departs from the intended image line into the surrounding area and then again returns to the image area. The reason why the definition will be obscured in the event the stylus departs from the intended image line can be understood from the following description of the construction of the cover member 13.

In accordance with the invention, as noted above, the cover element 13 is normally opaque but is rendered translucent in a local area by the application of pressure at that area. To this end, the cover member 13 comprises a laminated structure including an upper film 32, a lower film 33, and an intermediate layer of an opaque material which is relatively non-adherent to the films and capable of flowing when pressure is applied to it. In the present instance, the opaque material 34 consists of a dispersion medium, an opacifying agent dispersed in the medium, and a gellant to control the flow characteristics of the mixture.

As illustrated in FIG. 4, when an impression is applied to the cover 13, the upper film 32 is displaced against the lower film 33 expressing the material 34 from the area between the films into the adjoining space. The flow characteristics of the material 34 are selected so as to permit the material to be readily expressed by the application of pressure to the upper film 32 by the stylus 18 and yet to remain free of the impression area for a selected period after the pressure is removed by the passage of the stylus therebeyond. Since the translucent films 32 and 33 are substantially transparent in this instance, and since the opaque material is relatively non-adherent to the film, the expression of the material from between the films renders the area substantially transparent while the remaining area stays substantially opaque.

In order to provide a sharp impression by the stylus 18, at least the upper film must be sufficiently flexible to be displaced against the lower film 33 upon application of pressure by the stylus. A suitable film for this purpose is a flexible polyvinyl chloride film such as Rucoam supplied by Rubber Corporation of America, having a thickness of 3½ mils. This film is characterized by a low glare to provide a good viewing surface. The bottom film 33, on the other hand, need not be of the same character and it has been found that polyethylene terephthalate film such as Mylar, supplied by E. I. DuPont de Nemours Co., of a thickness of one mil is suitable.

The opaque material 34 between the films may be composed of mineral oil as the dispersing medium. Carbon black may be the opacifying agent in the event the background 24 is white, or titanium dioxide may be the opacifying agent in the event that the background 24 is black so as to provide a contrast between the opaque cover 13 and both the background 24 and the indicia 23 on the backing member 12. Alternatively, the backing member 12 may be of the same color as the opaque cover 13 to preclude any reinforcement or reward for random scribbling. The gellant may be a reaction product of montmorillonite-type clay and an organic amine substance, such as Bentone-38 supplied by National Lead Co. This mixture has been found to give sufficient opacity to the cover if it is of a thickness of approximately 3 to 4 mils between the films 32 and 33.

The materials discussed above enable the cover to be used repeatedly by obliterating the impression made by the stylus 18. By applying pressure to the cover in a wiping motion, over a wide area, the material 34 is caused to flow back between the films 32 and 33 into the area of the impression to obliterate the impression and return the film to its original uniformly opaque condition. In order to assist in the return of the cover 13 to its opaque condition, the instruction panel may be folded over the cover and application of pressure to the cover panel will be transferred over a wide area to the cover, thereby causing the material to flow into the area of the impression. To this end, the cover is preferably provided with a hard planar surface so as to transfer the pressure as shown in FIG. 5 over a wide area of the cover thereby obliterating the impression made by the stylus.

The characteristics of the cover 13 as described above and particularly as illustrated in FIG. 4 serve not only to disclose the latent or target image 23 by virtue of displacement of the opaque filling material 34 by the stylus, but also serve another important function. If the student, in applying the stylus or marking element fails to follow the line of the latent image and causes the stylus to traverse across the line between the image area and the surrounding area, as by a repeated scribbling motion, the consequent displacement of the opaque filling material 34 from one area to an adjacent area in the space between the upper and lower films 32 and 33 will obscure the definition of the image and, in fact, may virtually obliterate the image. Thus this displacement of the opaque filing material 34 in this situation will act to deny the student the reward, i.e., formation of a clearly defined character conforming with the control image.

In connection with a device of the type shown in FIGS. 1 to 5 inclusive, it is pointed out, that if desired, the target image 23, instead of being applied to a separate backing element 12 may be applied to the inside or upper surface of the lower film 33 of the cover 13. In this event, the backing element 12 may not even be needed. Where the lower film 33 is transparent, the target image may also be applied if desired to the outside or under surface of that film, and in this case also the backing element 12 may not be needed, although in all cases it would be preferred to have a background color contrasting with that the target image provided either on the backing element, such as indicated at 12, or upon a surface of the lower film 33 of the device 13.

It is apparent that the cover element of the present invention provides a laminated structure which is normally opaque but which may be rendered translucent or less opaque in localized areas by the application of an impression thereto. A structure of this character is not limited in use to an educational device such as set forth herein but has other uses. For instance, the structure may be used as a stencil in exposing light-sensitive media for example of the type used in diazo printing, blueprinting, and the like. Furthermore, the structure may be used as a film through which light may be projected for display of the characters impressed on the structure. The film thicknesses and thickness of the intermediate material as well as its flow characteristics may be modified to accommodate to the particular use to which the structure is applied and the degree to which the structure will be subjected to repeated use. In addition, other ingredients may be added to the intermediate material or to the films to render them susceptible to having the impressions obliterated by means other than mere pressure, for example by application of magnetic and/or electrical fields and/or heat, vibration, and/or like energy. The laminated structure may also be used on a contrasting background to provide a display board which is readily erasable, in the nature of a blackboard. Other uses for the structure will be apparent.

In considering the embodiment as illustrated in FIGS. 6 to 9 inclusive which utilizes a chemical system instead of a mechanical system for insuring reward or reinforcement to the student only in the event of accurate and correct formation of a given character, it is first pointed out that the work surface or work sheet of a device of this type need not be of laminated or multi-part construction, as with the backing element 12 and the cover 13 in the first embodiment. Instead, the work sheet or work surface need only comprise a single element, such as a single sheet of paper appropriately treated or coated in certain areas as will now be described. Therefore work sheets of this type may be bound in simple workbooks, without requiring any special constructional features.

For purposes of illustration, in FIGS. 6 to 9, the device is shown as comprising a work surface 35 hingedly interconnected with an instruction panel 15 which may be of essentially the same arrangement and construction as described above with reference to the first embodiment, including provision for a control image 21 and a sleeve 17 for the mounting or a stylus, in this case identified by the numeral 36.

Figure 7:
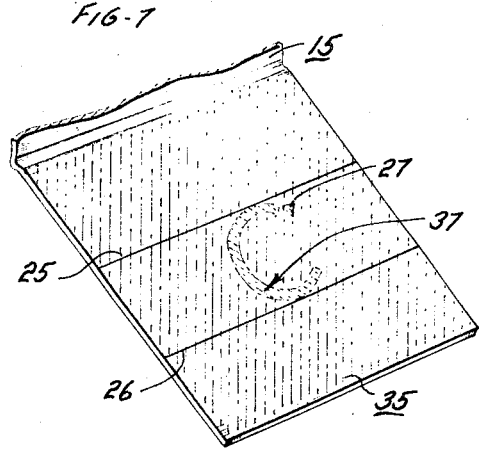
FIG. 7 is a fragmentary view of a portion of the device shown in FIG. 6 but indicating by certain distinguishing shading the image area and the surrounding area, although it is to be understood that the distinction between those two areas is not actually visible or discernible in the preferred embodiment of the invention.

Although the surface of the work sheet 35 is provided with certain materials printed thereon in the area of the latent image and in the surrounding area, the materials in those two areas are preferably not visibly distinguishable initially, so that the work sheet 35 appears to be unmarked, excepting only for whatever guide means are applied, for instance the guide lines 25 and 26 and the starting guide 27, as shown in FIG. 6. However, as shown in FIG. 7 the image area which is here shown outlined in dotted lines at 37 is actually covered, as by printing, with a material of one kind indicated by shading of one type, and the area surrounding the image area is covered, as by printing, with a material of another kind, as is indicated in FIG. 7 by a shading of different type. The two materials are preferably optically indistinguishable initially, so that the image of the character is not visible. The material applied to the image area however is capable of being rendered visible by the action of a stylus in the nature of a pen or other marking element, adapted to leave a trace of material upon the work surface that is chemically so related to the material applied to the image area as to develop the image of the character and cause it to become visible in contrast with the surrounding area.

As an example, a redox system may be employed, for instance by applying to the image area a silver salt and by employing a stylus or pen adapted to deliver sodium formaldehyde sulfoxylate to the work surface. If the marking element is correctly applied only to the image area, the image will show up as a black image, notwithstanding the fact that initially the silver salt is substantially indistinguishable upon an ordinary sheet of white paper. In this example the area surrounding the image area desirably is coated with a composition containing citric acid, which is also initially visually indistinguishable from the paper or from the coating of the image area.

With this combination of materials employed in the image area, in the marking element and in the area surrounding the image area, a clearly visible and well defined image will be produced if the marking element is accurately maintained within the image area. However, if the marking element traverses the line between the image area and the surrounding area and again returns to the image area, the marking element will pick up some of the citric acid of the surrounding area, and the citric acid thus picked up by the stylus will deactivate the sodium formaldehyde sulfoxylate of the stylus to a limited extent, but sufficiently to impair its ability to reduce the silver salt and thereby darken the image area. This deactivation will not continue for long because the citric acid will soon be eliminated by flow of fresh solution to the tip of the stylus. However, the interval during which the sodium formaldehyde sulfoxylate is deactivated is sufficient to impair or obscure the development of the latent image.

For the foregoing purposes, it is of course contemplated that the amount of material applied to the area surrounding the image should be sufficient to provide for picking up some citric acid on the stylus and carrying it with the stylus back into the image area. In this way by displacement of material from the area surrounding the image into the area of the image the complete development of the image is prevented, thereby achieving the objective of impairing the definition whenever the stylus is not accurately maintained within the image area.

With a chemical system of this type, if the marking element is employed in a scribbling type of motion, the desired image may be obfuscated just as in the case of the mechanical system of FIGS. 1 to 5.

Figure 8:
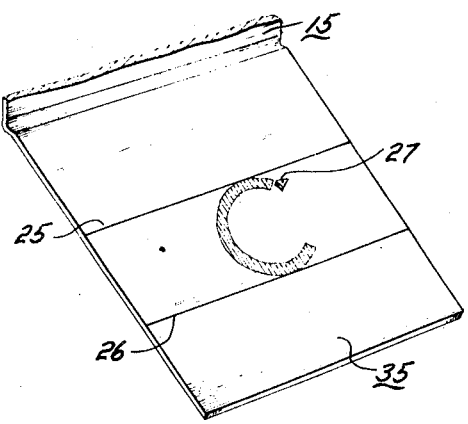
FIG. 8 is a view similar to FIG. 7 but illustrating the work surface of the device of FIGS. 6 and 7 after the latent image has been acted upon by the stylus to render the image visible.

Assuming, however, that the student correctly follows the pattern of the control image 21, the latent image will be made visible, in the manner clearly illustrated in FIG. 8, but this image can only be produced with clarity of definition by avoiding traverse of the marking element from the area of the image to the surrounding area and again back into the image area. Such a chemical embodiment of the device of the invention, as with the mechanical or physical system described with reference to FIGS. 1 to 5 inclusive, thus assures that the student only receives the reward or reinforcement when the work is properly performed.

Figure 9:
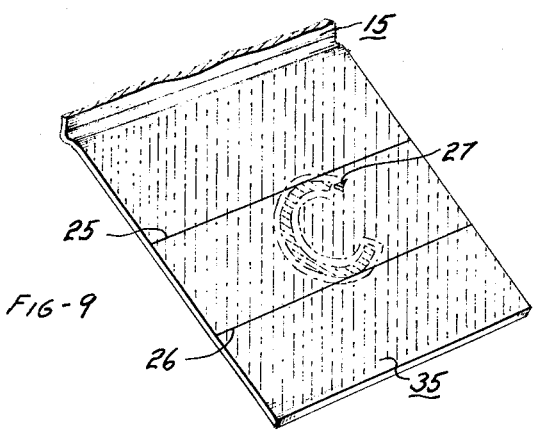
FIG. 9 is a view similar to FIG. 7 but illustrating a variation in the arrangement of the image area and the surrounding treated area, as will further appear.

If desired, the initially indiscernible materials applied to the image and surrounding areas may be slightly spaced from each other in the manner illustrated in FIG. 9, so that some small leeway may be given the student before serious impairment of the definition of the image occurs.

When using a chemical system of the kind above referred to, the various components of the system (the compositions to be applied to the image area and to the area surrounding the image, and the composition to be used in the stylus) may be formulated in a variety of ways. Various details of such formulations need not be considered herein as they form no part of the present invention per se, but it may be mentioned that in the use of a silver salt such as silver nitrate for the composition to be applied to the image area, the salt may be applied to the work sheet in an aqueous-alcohol solution which will dry, leaving the solids on the desired area. The composition to be applied to the area surrounding the image, i.e., the composition containing citric acid may be formulated as an aqueous solution which will again dry, leaving the solids when applied to the area surrounding the image. Various other constituents may be present in the coating compositions including thickening or thixotropic agents and also surfactants.

The stylus in this system desirably takes the form of a capillary pen, a ball point pen or otherwise, in which a liquid or semi-liquid composition is used, containing the sodium formaldehyde sulfoxylate dissolved in water.

A redox system may also be employed in which a silver salt is used in the composition for coating the image area, in which citric acid is used in the composition for coating the surrounding area and in which stannous chloride is used in the stylus. Formulations similar to those referred to above may be employed in such a modified redox system.

Various other chemical systems may alternatively be employed, for instance a system operating on the principle of utilizing materials of different pH. For example the image area may be coated with a material containing phenol phthalien, with a pen or marking element carrying sodium carbonate. Although the composition applied to the image area may be substantially colorless, upon the action of the pen a red image is produced. In this system the coating applied to the area surrounding the image may suitably contain citric acid which, upon contact of the pen will temporarily deactivate or neutralize the sodium carbonate at the tip of the pen. The effect of this pH combination will produce results similar to those described above.

Still another system which may be employed is one operating on the principle of a chelating action. In this system the image area may desirably be coated with a 5% solution of dimethyl glyoxime in ethyl alcohol. The stylus may contain a nickel salt, such as nickel sulfate, and this will yield a red image. A composition containing citric acid, again in aqueous solution, may suitably be applied to and dried on the area surrounding the image area. Here again the effect is similar to that provided by the redox system and by the pH system.

Any of the foregoing chemical systems may be utilized in a device in which the image is made up of discontinuous or dotted lines.

In preferred chemical systems, it is contemplated to employ white paper for the work sheet and to employ compositions to be applied to the target or image area and to the surrounding area which are substantially colorless. If desired, however, some coloring materials such as dyes or pigments may be included in some of the compositions applied to the image area and to the surrounding area, but in such event, it is contemplated that the coloring material should be the same in each of the compositions, because in order to achieve the purposes of the invention the image area and the surrounding area should initially be substantially optically indistinguishable for each other. It is only in this way that reinforcement of the student will be provided only as a result of the student correctly performing the work, i.e., accurately following the intended contours or lines of the latent image to be developed.

With further reference to the character of the compositions to be applied to the image area and to the surrounding area it may be noted that with any of the chemical systems above referred to, the quantity of material located in the image area and in the surrounding area may if desired be sufficient to introduce a "smearing" capability, i.e. a condition tending to directly carry or smear the composition from one area into another, for instance from the image area into the surrounding area under the "dragging" action of the stylus.

This "smearing" capability is in the nature of a physical or mechanical action and may also be relied upon either alone or in combination with chemical action, for the purpose of obscuring the definition of the image.

Still another system which may be utilized and which is of mechanical or physical type, is as follows:

The work sheet may comprise a piece of blotter paper on which is printed or otherwise applied in the image area, for instance in an area such as indicated at 37 in FIG. 7, a composition tending to diminish the absorption of an ink into the structure of the blotter paper. The area surrounding the image area would remain untreated. The stylus employed in this instance may be one containing an ink of common type which will produce a colored image when the stylus activity is confined to the area of the image. In the event of movement of the stylus beyond the boundary of the image area, the absorptive characteristic of the blotter paper will immediately cause blotching and thereby impair the definition of the image. The student, therefore, will receive his reinforcement only when the stylus is maintained within the image area.

And still other systems may occur to those skilled in the art that can accomplish the objectives of the invention. For example, the area surrounding the image may contain a material such as a soft wax, sugar or the like, that temporarily will blind or plug the capillaries of a fluid dispersing stylus. Thus when the stylus leaves the image area, the stylus will not dispense fluid upon its return to the image area until the blinding material is removed as by further use of the stylus in an area not containing the blinding material.

And yet another system makes use of a color system comprised of two colorless components that, upon hydrolysis, will cause the development of a color image. In this system, the work surface can be covered with one component and the other component printed thereover in the pattern of the desired image. When water is applied to the latent image, as with a paint brush, the image will be developed and, if the student strays from the image area, color will be dragged along to obfuscate the image.

As a production technique, it may prove useful, in the above chemical systems, to treat the entire work surface with the interfering agent and then print an image over the dried interfering agent. While there may be some reaction at the interface, the image will be capable of being developed, at least on its upper surface by contact with the fluid dispensed from the stylus. It is to be understood that this technique is within the scope of the appended claims wherein the interfering agent is referred to as being present adjacent the latent image.

We claim:
1. An educational device comprising a work surface; a control image; a first area of the work surface in which a latent image logically related to the control image may be developed by the action of a stylus, a second area of the work surface adjacent to the first area providing for obscuring the definition of the image upon traverse of the stylus from one of said areas into the other, so that the student is reinforced by a clearly defined image only as a result of accurately maintaining the stylus in the first or image area of the work surface.

2. An educational device according to claim 1 wherein the first area, before being acted upon by the stylus, is substantially visually indiscernible from the remaining area of the work surface.

3. An educational device adapted for use with a marking element, the device comprising a work surface in a first area of which a latent line image of a character may be made visible by tracing the line thereof with the marking element, and the work surface having a second area adjacent the first along at least a portion of the image line and providing for obscuring the definition of the image upon traverse of the marking element from one of said areas into the other, whereby the latent image may be developed with clear definition and consequent reinforcement of the student's learning process only by accurately tracing the image line.

4. A device as defined in claim 3 and further including guide means adjacent a portion of the image line indicating the location thereof to facilitate tracing the image line and thus rendering the image visible.

5. An educational device adapted for use with a marking element comprising a work surface, means associated with a first area of the work surface for providing a latent line image of a character initially optically indistinguishable from an adjacent area of the work surface and which may be made visible by tracing the line thereof with the marking element, means associated with said adjacent area for obscuring the definition of the image upon traverse of the marking element from one of said areas into the other, so that a clearly defined image may be developed only by accurately tracing the image line.

6. An educational device adapted for use with a marking element comprising a work surface, means associated with a first area of the work surface for providing a latent image initially optically indistinguishable from an adjacent area of the work surface and which may be made visible by applying the marking element in the area of the image, means associated with said adjacent area for obscuring the definition of the image upon traverse of the marking element from one of said areas into the other, so that a clearly defined image may be developed only by accurately confining the application of the marking element to the first area.

7. A device as defined in claim 6 in which the means comprising the latent image and the means for obscuring the definition of the image comprise a backing having a visible image thereon and an opaque cover over the backing normally concealing the image, the cover comprising a transparent and flexible cover sheet and a layer of opaque material between the transparent sheet and the backing, said opaque material being flowable and being locally displaceable by the action of the stylus to render the cover transparent, thereby providing for visual exposure of the image upon application of the stylus to the image area.

8. An educational device for training students to make a character comprising in combination a backing having indicia thereon reproducing the proper form of said character, a cover sheet which is normally relatively opaque overlying said backing and covering said indicia, said cover being responsive to the application of an impression in a local area to reduce its opacity in said area to expose the backing, said impression, if made in the area overlyng said indicia, exposing said indicia.

9. An educational device according to claim 8 including guide means on said cover in registry with the indicia on said backing to locate the starting point for making the impression on said cover to register with said indicia.

10. An educational device according to claim 8 wherein said device includes an instructing panel attached thereto and projecting beyond said cover so as to be visible to provide instructions for said application of the local impression.

11. An educational device according to claim 10 including a hinge interconnecting said panel to said backing, said hinge permitting said panel to be folded over said cover sheet to protect the same against inadvertent application of impressions thereon.

12. A device according to claim 11 wherein said panel has a hard planar surface engaging said cover when folded over, said surface upon application of pressure thereto cooperable with said cover to obliterate said impression and render the cover of substantially uniform opacity throughout to enable repeated use of said device.

13. A device according to claim 12 wherein said cover comprises a laminated structure having inner and outer layers composed of translucent film, at least one of said layers having sufficiently flexibility to receive an impression in a localized area, and an intermediate layer of an opaque material relatively non-adherent to said film layers and capable of flowing upon application of pressure thereto, whereby, upon application of an impression to a localized area of said laminated structure, said intermediate material flows away from said area into adjacent areas intermediate said film layers, reducing the opacity of said structure in said localized area.

14. A device according to claim 13 wherein said intermediate material comprises a mixture of dispersing medium, an opacifying agent dispersed in said medium, and a gellant to control the flow characteristics of said mixture.

15. A device according to claim 14 wherein said opacifying agent is carbon black to provide a blackness in said cover.

16. A device according to claim 14 wherein said opacifying agent is titanium dioxide to provide a whiteness in said cover.

17. A device according to claim 14 wherein said dispersing medium is mineral oil.

18. A device according to claim 14 wherein said gellant is a reaction product of clay and organic amine substance.

19. An educational device for enabling students to distinguish between correct and incorrect procedures comprising in combination a backing, a cover sheet which is normally substantially opaque overlying said backing, said covering being responsive to the application of an impression in a local area to reduce its opacity in said area to expose the backing, guide means on said cover to indicate a local area for making a correct impression, and indicia means on said backing contrasting with the background of said backing, said indicia underlying said guide means and corresponding to said correct impression so as to be exposed through said less opaque area of the cover sheet when the impression is correct, said contrasting background being exposed when the impression is incorrect.

20. An educational device according to claim 19 wherein said guide means comprises a starting guide and guide lines defining limits of said correct impression.

21. A device according to claim 19 wherein said cover element is of a color contrasting to both said indicia and said background.

22. A device according to claim 19 including an instructing panel attached to said backing and projecting beyond said cover so as to be visible to provide instructions for making said correct impression.

References Cited

UNITED STATES PATENTS

| 2,697,884 | 12/1954 | Dechert | 35—66 |
| 3,363,336 | 1/1968 | Skinner | 35—36 |

FOREIGN PATENTS 689,870  6/1964  Canada.

EUGENE R. CAPOZIO, Primary Examiner

H. S. SKOGQUIST, Assistant Examiner

U.S. Cl. X.R.

35—37